Dec. 5, 1933.  C. GRIESMEYER  1,938,452
CONTAINER FOR GARBAGE RECEPTACLES
Filed Aug. 22, 1932
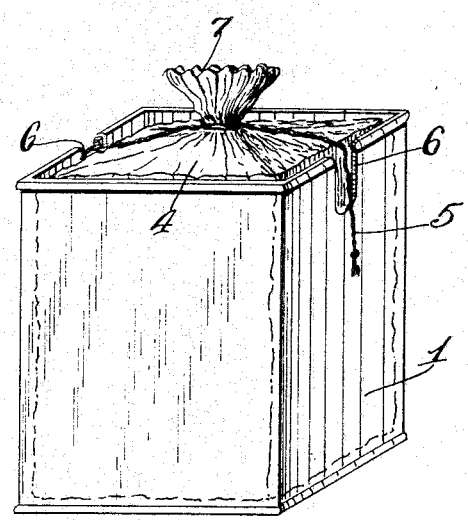
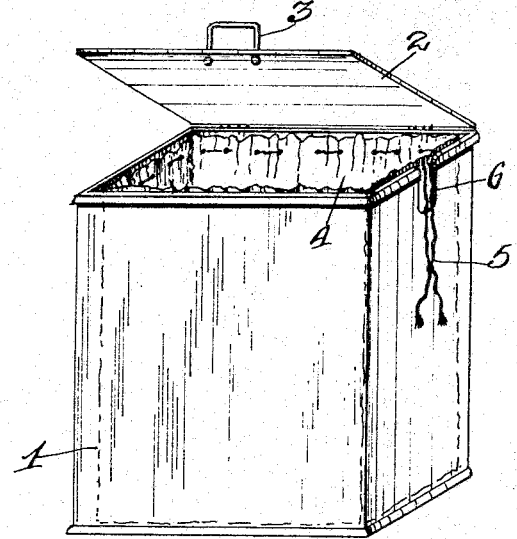
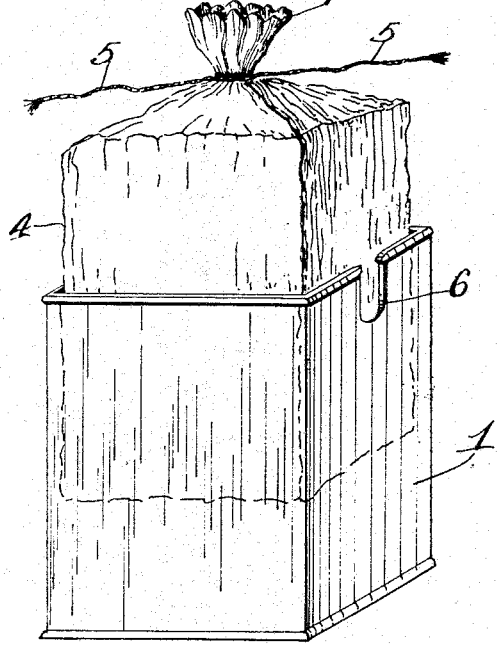
INVENTOR.
Carl Griesmeyer
BY
ATTORNEY.

Patented Dec. 5, 1933

1,938,452

UNITED STATES PATENT OFFICE 1,938,452

CONTAINER FOR GARBAGE RECEPTACLES

Carl Griesmeyer, Chicago, Ill.

Application August 22, 1932. Serial No. 629,922

1 Claim. (Cl. 220—65)

The present invention relates to an improved container for garbage receptacles.

One of the objects of the invention is to provide an improved container for garbage receptacles that can be placed in the receptacle for receiving the garbage and readily removed so as to leave the receptacle in a clean sanitary condition.

Another object of the invention is to provide a container of the above character which can be constructed of a specially prepared paper and cheaply manufactured and placed in a garbage receptacle to facilitate the removal of the garbage therefrom.

A further object of the invention is to provide a container for garbage receptacles which can be readily provided with means for closing the same to facilitate its removal from the receptacle without displacing any of its contents.

With the above and other objects in view the invention consists in the novel features of construction, the combination and arrangement of parts hereinafter more fully described, pointed out in the claim and shown in the accompanying drawing in which:

Fig. 1 is a perspective view of a garbage receptacle showing my improved container therein and closed ready for removal.

Fig. 2 is a similar view showing the container closed and being removed from the receptacle, and Fig. 3 is a perspective view showing the container in use in a receptacle having a cover hinged thereon.

This improved container can be made for use in connection with garbage receptacles of various sizes and shapes and of varied thickness according to the type of material used in the construction of the container.

It will be noted that in the present instance the body (1) of the garbage receptacle is substantially rectangular in shape and provided with a cover (2) that may be hinged to the receptacle if desired. In a great many instances the cover (2) is provided with a handle (3).

My improved container, as will be noted in the present instance, has a flexible or foldable substantially rectangular body (4) to fit fairly snug upon the interior of the receptacle (1). At convenient points adjacent the upper open end of the container, the walls thereof are provided with a plurality of openings through which a draw string (5) is threaded.

It will be apparent from the foregoing that the container can be placed in the receptacle and its open end opened up to full extension as shown in Fig. 3. In this form of container, the draw string (5) is extended through a notch (6) in one side of the receptacle so as to keep it free from contact with the garbage, whereby it will be readily accessible when the container is full for drawing the upper end of the container together and assist in removing the container from the receptacle.

In Figs. 1 and 2 the container is shown in use with a garbage receptacle which may or may not be provided with a cover and in this instance the ends of the draw string are extended through the notches (6) in opposite walls of the receptacle and the upper edge of the container extends considerably above the draw string whereby to provide a hand grip (7) when the string is drawn together as shown in Figs. 1 and 2, whereby the container can be readily removed from the receptacle.

The container can be made from foldable material such as moisture-proof paper of suitable strength or some similar material which will not absorb enough moisture to cause the container to tear or rip during handling after being filled.

While I have shown and described the preferred embodiments of my invention, it will be readily apparent from the foregoing that various changes and alterations may be carried out when putting the invention into practice without departing from the spirit of the invention or the scope of the appended claim.

What I claim is:

In combination with a metal container having an open top and opposed notches in the upper edges thereof, of a flexible moisture-proof receptacle for said container having one end normally open and having spaced openings adjacent the edge of the open end of said receptacle, and a draw string threaded through said openings whereby to close the open end of the receptacle, and having their ends normally passing through said opposed notches.

CARL GRIESMEYER.